United States Patent
Peltier (10) Patent No.: US 10,109,930 B2
(45) Date of Patent: Oct. 23, 2018

(54) WIRE CONNECTION ASSEMBLY WITH TELESCOPIC BINDING SCREW

(71) Applicant: Tyco Electronics Simel SAS, Gevrey-Chambertin (FR)

(72) Inventor: Bruno Peltier, Apollinaire (FR)

(73) Assignee: Tyco Electronics Simel SAS, Gevrey-Chambertin (FR)

( * ) Notice: Subject to any disclaimer, the term of this patent is extended or adjusted under 35 U.S.C. 154(b) by 0 days.

(21) Appl. No.: 15/463,724

(22) Filed: Mar. 20, 2017

(65) Prior Publication Data

US 2017/0194725 A1    Jul. 6, 2017

Related U.S. Application Data

(63) Continuation of application No. PCT/EP2015/067170, filed on Jul. 27, 2015.

(30) Foreign Application Priority Data

Sep. 22, 2014  (EP) ..................... 14306458

(51) Int. Cl.
   *H01R 4/36*     (2006.01)
   *H01R 4/30*     (2006.01)
   *F16B 31/02*    (2006.01)

(52) U.S. Cl.
   CPC ............ *H01R 4/36* (2013.01); *H01R 4/307* (2013.01); *F16B 31/021* (2013.01)

(58) Field of Classification Search
   CPC ......... F16B 35/005; H01R 13/53; H01R 4/36; H01R 11/12; G01D 4/002
   USPC .......................... 439/474, 810, 814; 411/393
   See application file for complete search history.

(56) References Cited

U.S. PATENT DOCUMENTS

| | | | | |
|---|---|---|---|---|
| 4,984,946 A | * | 1/1991 | Phillips, II | B29C 45/16 411/183 |
| 5,494,462 A | * | 2/1996 | Auclair | H01R 4/66 411/300 |
| 5,584,625 A | * | 12/1996 | Petri | F16B 31/021 411/178 |
| 6,109,850 A | * | 8/2000 | Commins | F16B 25/0031 411/387.2 |
| 8,317,443 B2 | * | 11/2012 | Stauch | F16B 31/021 411/2 |
| 8,875,368 B2 | * | 11/2014 | O'Sullivan | F16B 31/021 29/426.2 |

(Continued)

FOREIGN PATENT DOCUMENTS

| EP | 1833117 A2 | 9/2007 |
|---|---|---|
| GB | 2443001 A | 4/2008 |

OTHER PUBLICATIONS

PCT International Search Report and Written Opinion, dated Oct. 19, 2015, 8 pages.

*Primary Examiner* — Gary Paumen
(74) *Attorney, Agent, or Firm* — Barley Snyder (57) ABSTRACT

A wire connection assembly comprises a connector body and a binding screw. The connector body forms a wire receiving chamber and has a threaded bore extending perpendicular to the wire receiving chamber. The binding screw has an inner bolt and an outer bolt. The inner bolt includes an outer thread and an inner breaking point. The outer bolt includes an inner thread engaging the outer thread, a threaded section engaging the threaded bore, and an outer breaking point.

24 Claims, 6 Drawing Sheets

(56) References Cited

U.S. PATENT DOCUMENTS

2008/0101886 A1    5/2008  Peltier
2012/0201625 A1*   8/2012  Ikuno ................... F16B 31/021
                                                              411/5
2012/0305723 A1*  12/2012  Heath ..................... F16B 2/065
                                                           248/228.1

* cited by examiner

WIRE CONNECTION ASSEMBLY WITH TELESCOPIC BINDING SCREW

CROSS-REFERENCE TO RELATED APPLICATIONS

This application is a continuation of PCT International Application No. PCT/EP2015/067170, filed on Jul. 27, 2015, which claims priority under 35 U.S.C. § 119 to European Patent Application No. 14306458.2, filed on Sep. 22, 2014.

FIELD OF THE INVENTION

The present invention relates to a binding screw, and more particularly, to a binding screw for a wire connection assembly.

BACKGROUND

Wire connection assemblies comprising binding screws are known in the art and are used for splicing or connecting stranded wires in power distribution networks or long distance transmission systems distributing electrical power. Known wire connection assemblies generally comprise a connector body having at least one receiving chamber into which a wire or a stranded end section thereof is inserted. The binding screw is then inserted into a bore which provides access to the receiving chamber from outside of the connector body and extends essentially perpendicularly to the wire. When the screw is then turned so that it enters the receiving chamber through the bore, the wire is compressed between the screw and the walls of the receiving chamber and an electrical contact is established between the screw, the inner walls of the receiving chamber, and the wire.

Due to weight and/or cost reduction requirements, especially for electrical powered distribution, stranded aluminum wires are increasingly used instead of the previously used copper wires. Stranded aluminum wires, however, are more prone to damage than copper wires when clamped by the binding screws. The aluminum wires or strands may break and rip apart due to the turning movement of the screw. Further, aluminum is covered by an aluminum oxide layer when exposed to air. The oxide layer has to be penetrated at least by the screw in order to establish a proper electrical contact between the screw and the wire.

SUMMARY

An object of the invention, among others, is to provide a wire connection assembly which forms a good electrical connection while decreasing the risk of damaging a stranded wire. The disclosed wire connection assembly comprises a connector body and a binding screw. The connector body forms a wire receiving chamber and has a threaded bore extending perpendicular to the wire receiving chamber. The binding screw has an inner bolt and an outer bolt. The inner bolt includes an outer thread and an inner breaking point. The outer bolt includes an inner thread engaging the outer thread, a threaded section engaging the threaded bore, and an outer breaking point.

BRIEF DESCRIPTION OF THE DRAWINGS

The invention will now be described by way of example with reference to the accompanying figures, of which.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Figure 1:
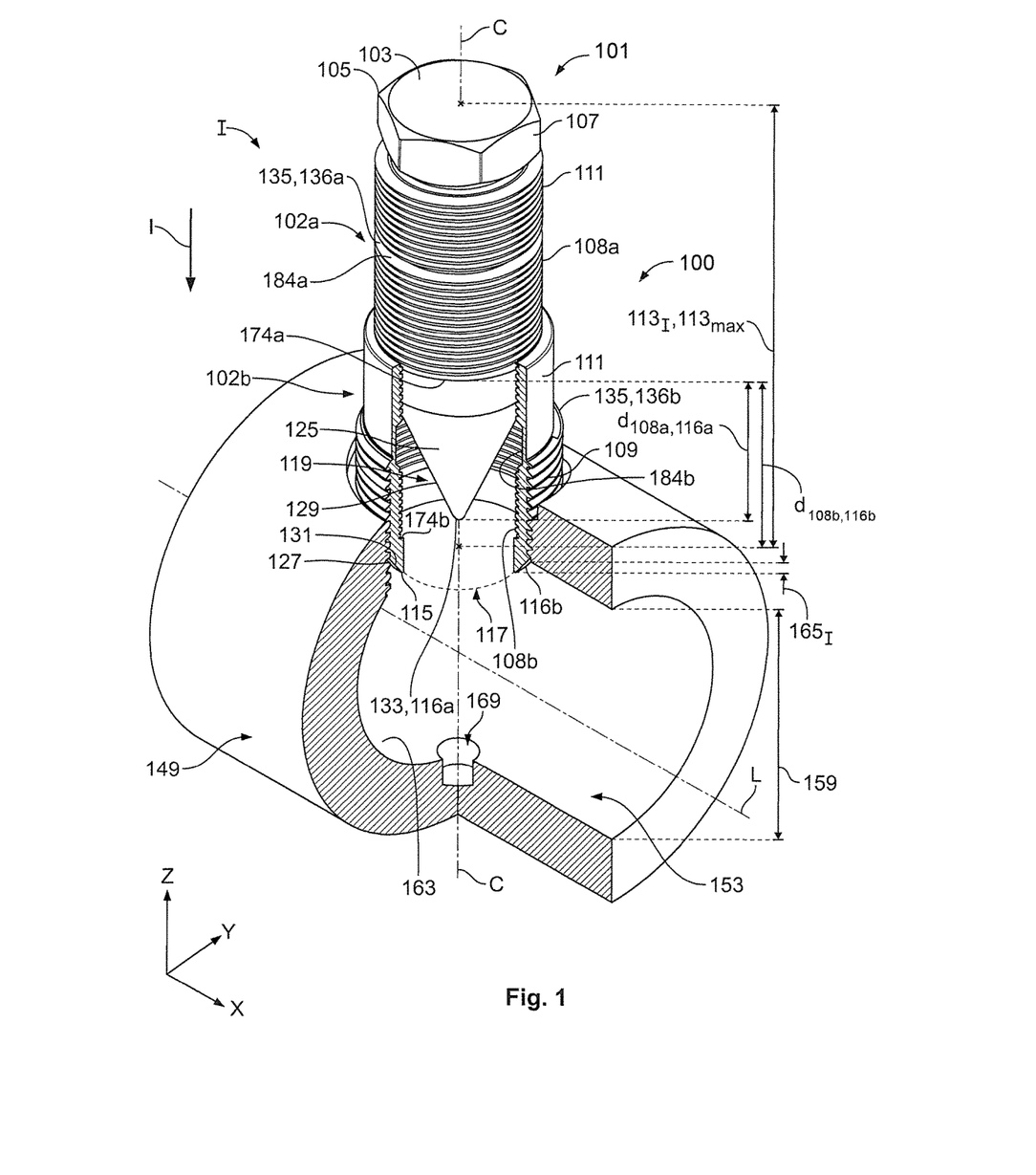
FIG. 1 is a partly sectioned perspective view of a wire connection assembly having a binding screw according to the invention in a pre-assembled state.

A wire connection assembly 100 including a binding screw 101 according to the invention is shown generally in a pre-assembled state I in FIG. 1. The wire connection assembly 100 extends along a longitudinal direction X, a transverse direction Y, and a height direction Z, which run perpendicularly to each other and thus form a Cartesian coordinate system. Henceforth, any mention of in front or behind relates to the longitudinal direction X, every mention of left and right relates to the transverse direction Y, and every mention of above and below, respectively, refers to the height direction Z.

The binding screw 101, as shown in FIG. 1, has an inner bolt 102a which can be inserted into an outer bolt 102b, in the form of a sleeve or bushing, of the binding screw 101. The inner bolt 102a has a driving section 105 disposed at an upper end 103 thereof, the driving section 105 including at least one driving element 107 for applying a torque M to the binding screw 101 around the central axis C thereof. The driving element 107 is formed and arranged to allow a positive fit with a counter driving element of a driving tool. The inner bolt 102a has an outer thread 108a which allows for screwing the inner bolt 102a into an inner thread 108b of the outer bolt 102b. The inner thread 108b and the outer thread 108a have essentially a same length measured in a direction parallel to the central axis C. An outer circumference of the outer bolt 102b has a threaded section 109 for inserting the entire binding screw 101 in an insertion direction I. The outer bolt 102b also has a body section 111 disposed above the threaded section 109 and having an unthreaded outer circumference.

The binding screw 101, as shown in FIG. 1, has a total length $113_t$ in the pre-assembled state I which is a maximum total length $113_{max}$ between the upper end 103 and an opposite lower end 115 of the binding screw 101. The binding screw 101 is at the maximum total length $113_{max}$ when a lowest thread of the outer thread 108a engages an uppermost thread of the inner thread 108b. In the pre-assembled state I, a tip 116a of the inner bolt 102a is disposed upwards of a rim 116b at the lower end 115 of the outer bolt 102b. A distance $d_{108a,116a}$ between a lower end of the outer thread 108a and the tip 116a of the inner bolt 102a measured essentially in parallel to the central axis C is less than a distance $d_{108b,116b}$ between an upper end of the inner thread 108b and the rim 116b measured essentially in parallel to the central axis C.

Figure 3:
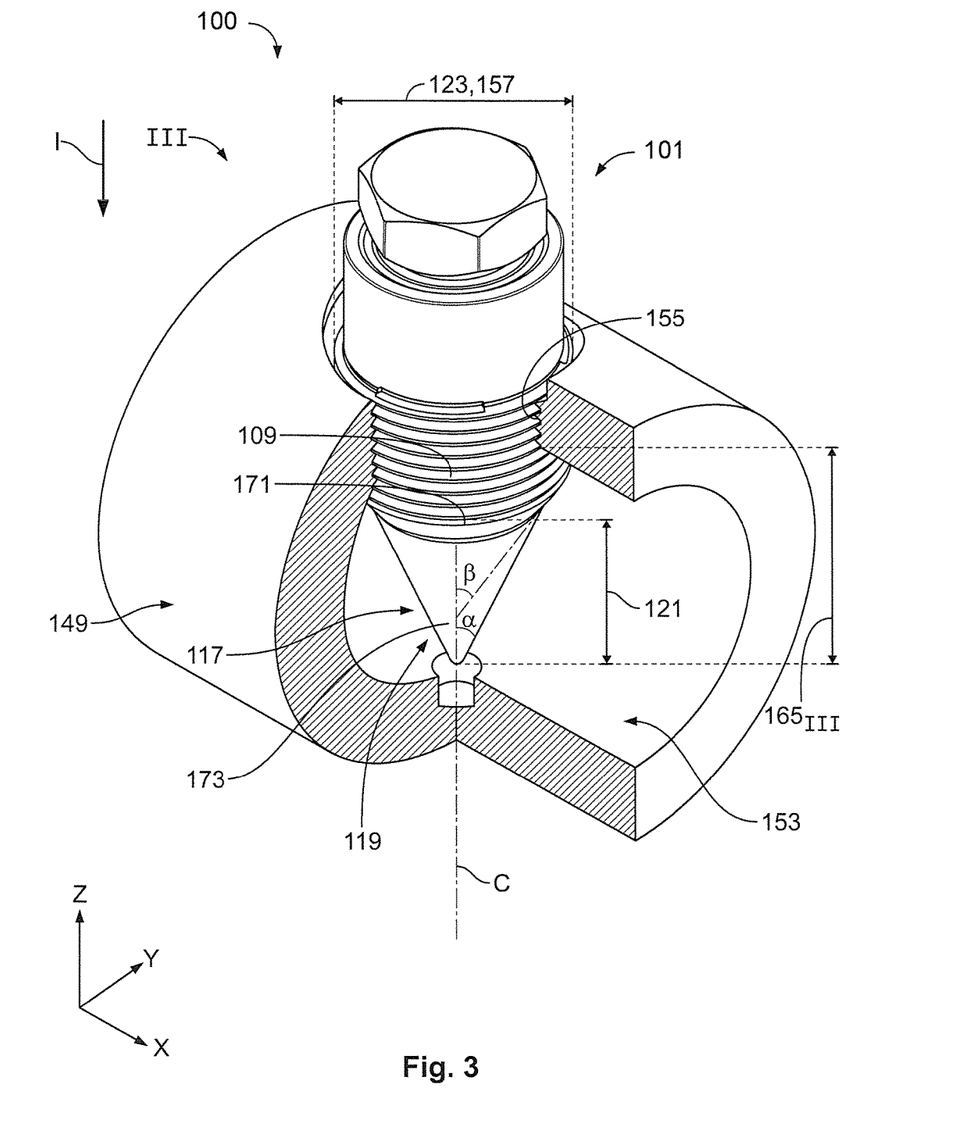
FIG. 3 is a partly sectioned perspective view of the wire connection assembly of FIG. 1 in a fully inserted state.

The binding screw 101, as shown in FIGS. 1 and 3, has a contact section 117 for contacting a wire in the region of the lower end 115. The contact section 117 has a penetration portion 119 which is adapted to pierce through the wire without damaging the strands thereof, yet break open any oxide layer thereon. The penetration portion 119, as shown in FIG. 3, has a length 121 adapted to a diameter 123 of the binding screw 101. The penetration portion 119 has, as shown in FIG. 1, a first conical section 125 formed at the inner bolt 102a and a second conical section 127, a frustoconical section in the shown embodiment, formed at the outer bolt 102b. A first surface 129 of the first conical section 125 and a second surface 131 of the second conical section have angles a and (3, respectively, for penetrating the wire as shown in FIG. 3. Accordingly, the penetration portion 119 forms a pointed end 133 of the binding screw 101.

Figure 5:
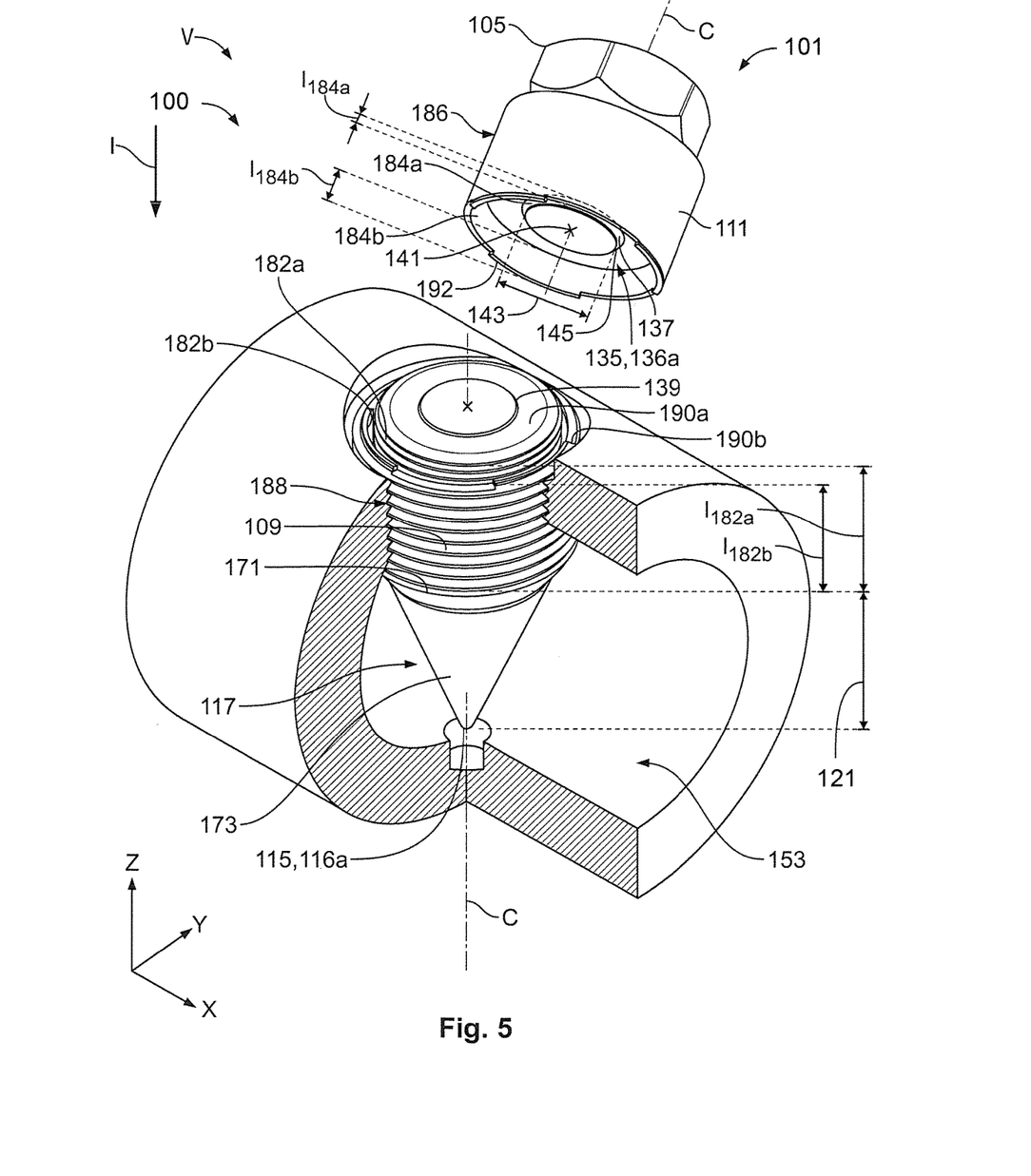
FIG. 5 is a partly sectioned perspective view of the wire connection assembly of FIG. 1 in a second breaking state.

As shown in FIG. 1, the binding screw 101 has a shear element 135 with an inner breaking point 136a formed at the inner bolt 102a and an outer breaking point 136b formed at the outer bolt 102b. The shear element 135, as shown in FIG. 5, has a third conical section 137 and a cylindrical section 139 which the third conical section 137 abuts. The third conical section 137 defines a lower diameter end 141 at the inner bolt 102a to define the inner breaking point 136a. At the lower diameter end 141, a diameter 143 of the shear element 135 is the smallest diameter of the shear element 135 in order to allow for precisely defining the inner breaking point 136a along the central axis C, in particular along a third surface 145 of the third conical section 137 as shown in FIG. 5.

The wire connection assembly 100, as shown in FIG. 1, has a connector body 149 forming a wire receiving chamber 153 for receiving a stranded wire. The wire receiving chamber 153 extends essentially along a longitudinal axis L of the connector body 149 running essentially in parallel to the longitudinal direction X. A threaded bore 155 extends essentially perpendicularly to the longitudinal axis L from outside the connector body 149 into the wire receiving chamber 153, essentially in parallel to the height direction Z. A bore diameter 157, shown in FIG. 3, depends upon a height 159 of the wire receiving chamber 153 shown in FIG. 1; the height 159 is larger than the bore diameter 157.

A length of the binding screw 101 jutting below an inner wall 163 of the wire receiving chamber 153 is a penetration depth 165, in particular a penetration depth $165_I$ in the pre-assembled state I shown in FIG. 1, with which the penetrating portion 119 protrudes in to the wire receiving chamber 153 and toward a wire located therein. Conversely, in a position in which a lower end of the threaded section 109 first engages the threaded bore 155, the lower end 115 of the binding screw 101 is located outside the wire receiving chamber 153, and the penetration depth 165 is zero. In order to maximize the penetration, on a side opposing the threaded hole 155, the inner wall 163 has an extension opening 169. The extension opening 169 enables the positioning of a rear end 171 of the contact section 117 fully within the receiving chamber 153 so that an entire surface 173 of the penetration portion 119 is positioned within the wire receiving chamber 153, as shown in FIG. 5.

Figure 2:
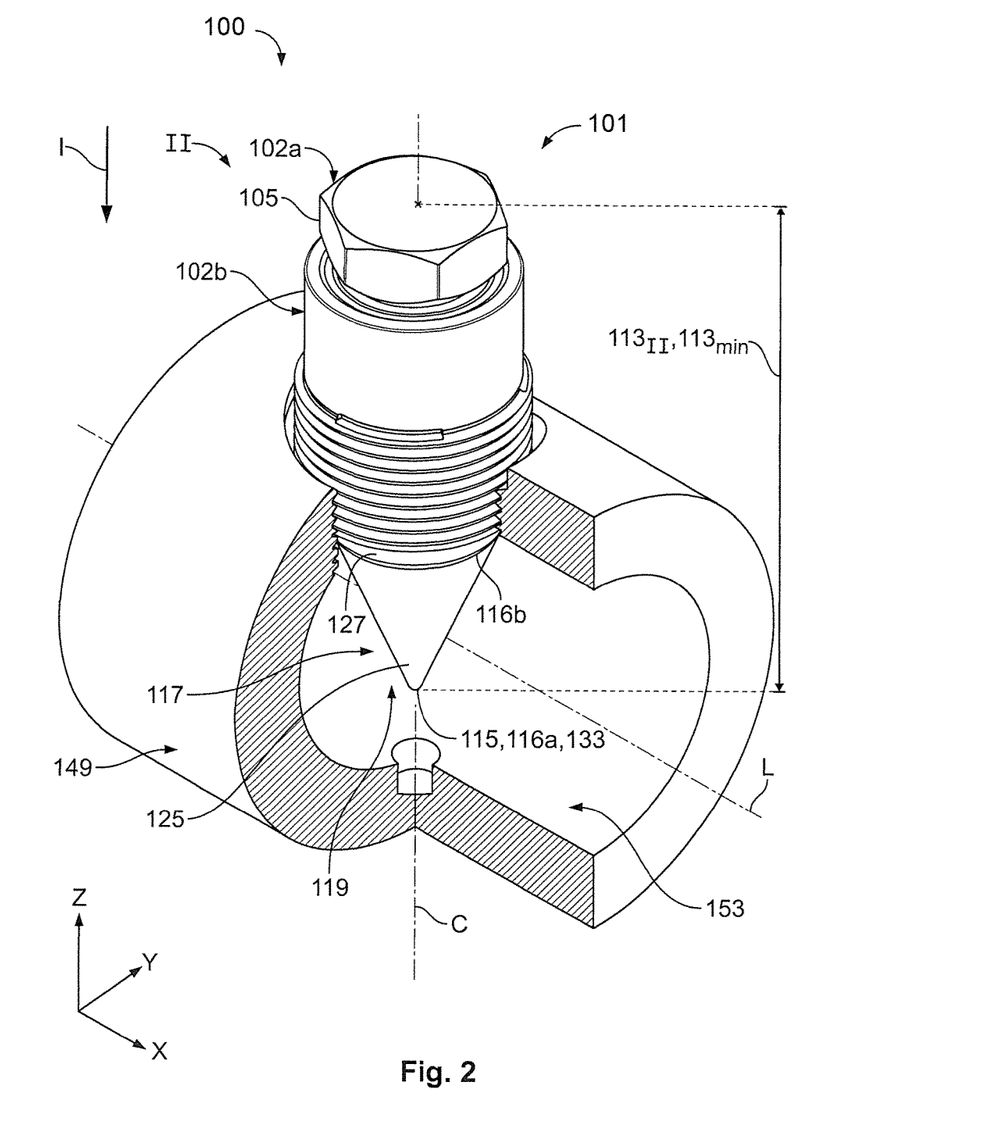
FIG. 2 is a partly sectioned perspective view of the wire connection assembly of FIG. 1 in a fully engaged state.

The wire connection assembly 100 and binding screw 101 are shown in a fully engaged state II in FIG. 2, in which the inner bolt 102a is fully inserted into the outer bolt 102b. In the fully engaged state II, an inner stop 174a formed at the inner bolt 102a abuts an outer stop 174b formed at the outer bolt 102b, shown in FIG. 1, in order to limit a movement of the inner bolt 102a with respect to the outer bolt 102b in the insertion direction I. In the embodiment shown in FIGS. 1 and 3, the inner stop 174a is formed at a lower end of the outer thread 108a and the outer stop 174b is formed at a lower end of the inner thread 108b. In other embodiments, a stop 174a, 174b may only be one stop on either the inner bolt 102a or the outer bolt 102b.

The driving section 105 is still accessible in the fully engaged state II shown in FIG. 2 as it juts above the outer bolt 102b, so that a torque may be applied to the driving section 105 such that the inner bolt 102a and the outer bolt 102b in the may be turned together in order to insert the entire binding screw 101 into the receiving chamber 153 along the insertion direction I. In the fully engaged state II, the binding screw 101 has a total length $113_{II}$ which is a minimal total length $113_{min}$ of the binding screw 101 measured essentially in parallel to the central axis C. The lower end 115 of the binding screw 101 is now defined by the tip 116a of the inner bolt 102a which is also a pointed end 133 of the penetrating portion 119.

The wire connection assembly 100 and binding screw 101 are shown in a fully inserted state III in FIG. 3, in which the binding screw 101 has reached a desired penetration depth $165_{III}$. The penetration depth $165_{III}$ in the fully inserted state III is chosen such that the rear end 171 of the contact section 117 and the surface 173 of the penetration portion 119 are fully inserted into the receiving chamber 153. The threaded section 109 is in full engagement with the threaded bore 155 of the wire connection assembly 100 in the fully inserted state III. The length 121 of the penetration portion 119 is at least two-thirds of the height 159 of the wire receiving chamber 153, and in the shown embodiment, is greater than the height 159, as the tip 116a is disposed in the extension opening 169.

Figure 4:
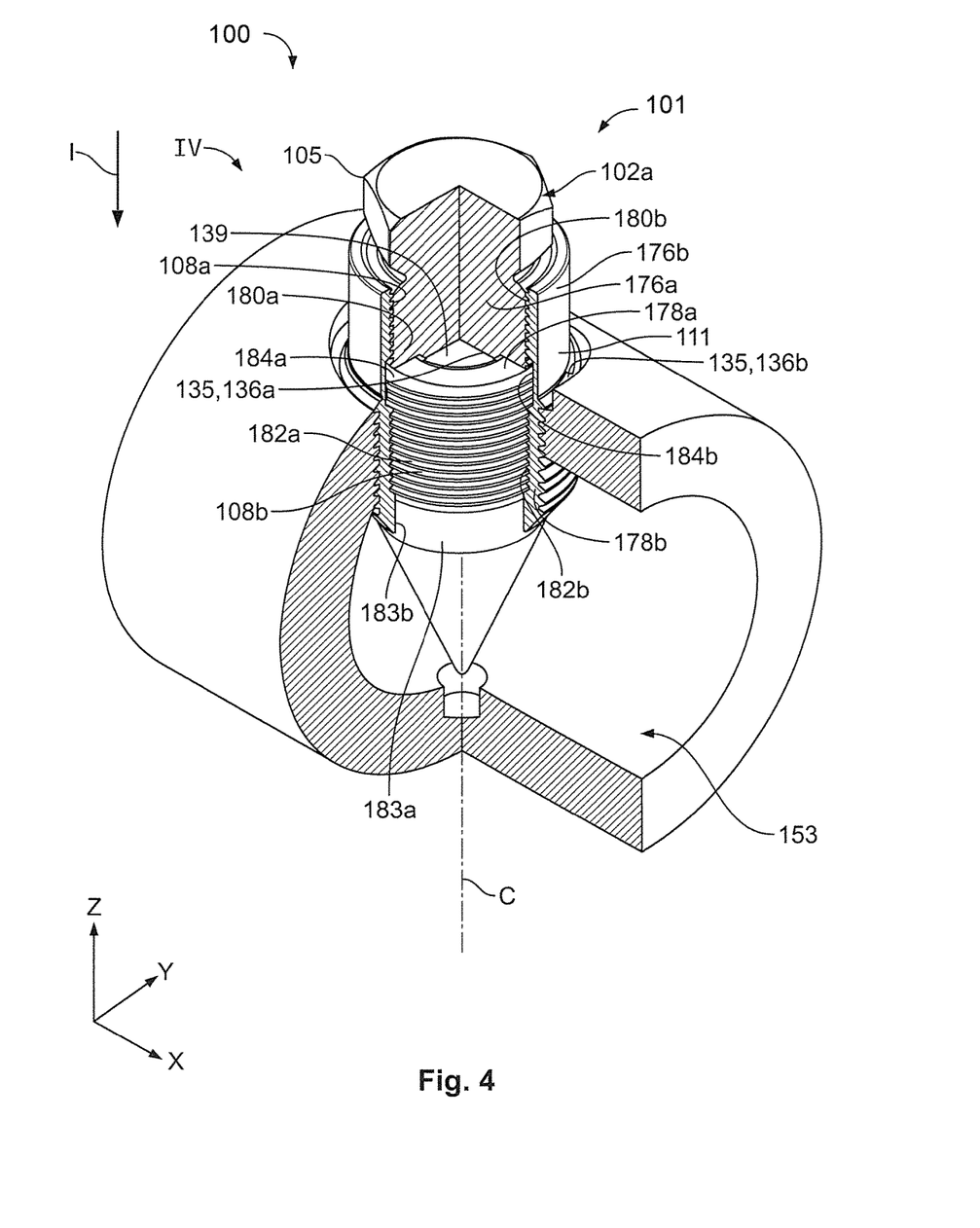
FIG. 4 is a partly sectioned perspective view of the wire connection assembly of FIG. 1 in a first breaking state.

The wire connection assembly 100 and binding screw 101 are shown in a first breaking state IV in FIG. 4. The first breaking state IV is reached when a torque applied to the driving section 105 after reaching the fully inserted state III exceeds a shearing torque of the shear element 135, in particular exceeding a shearing torque of the inner breaking point 136a. The inner bolt 102a is thereby divided into an upper part 176a and a lower part 178a.

The outer thread 108a is divided into an upper outer thread portion 180a and a lower outer thread portion 182a by an outer gap 184a. The upper outer thread portion 180a may be separated from the lower outer thread portion 182a already before shearing the inner bolt 102a at the predefined inner breaking point 136a in that an outer gap 184a is formed in the outer thread 108a. The inner breaking point 136a is disposed in the outer gap 184a.

An inner gap 184b, as shown in FIG. 4, is disposed in the inner thread 108b so that the inner thread 108b is divided into an upper inner thread portion 180b and a lower inner thread portion 182b. The shear element 135, in particular the predefined outer breaking point 136b is positioned at a lower end of the inner gap 184b of the outer bolt 102b. A length of the inner gap 184b is greater than a length of the outer gap 184a in a direction parallel to the central axis C. The outer bolt 102b can be divided at the predefined outer breaking point 136b into an upper part 176b and a lower part 178b to which the upper inner thread portion 180b and the lower inner thread portion 182b are associated, respectively. Further, a shaft section 183a of the inner bolt 102a is disposed below the outer thread 108a and positioned at the same height as a guiding section 183b formed by an inner circumference of the outer bolt 102b, so that the inner bolt 102a is guided and thus stabilized within the outer bolt 102b.

The wire connection assembly 100 and binding screw 101 are shown in a second breaking state V in FIG. 5. In transferring the binding screw 101 from the first breaking state IV into the second breaking state V, the upper part 176a of the inner bolt 102a is turned with respect to the lower part 178a so far that a pressure between the lower diameter end 141 and the cylindrical section 139, is generated and transferred via the upper outer thread portion 180a engaging the upper inner thread portion 180b in a way that it is converted to tensile stress acting between the upper part 176b of the outer bolt 102b and the lower part 178b of the outer bolt 102b. When this tensile stress exceeds the longitudinal strength or ultimate tensile strength of the shear element 135, in particular of the predefined outer breaking point 136b, the outer bolt 102b is separated into the upper part 176b and the lower part 178b. Hence, the entire binding screw 101 in the second breaking state V is divided into an upper part 186 and a lower part 188 as shown in FIG. 5. The upper part 186 comprises the driving section 105 and the body section 111. The lower part 188 comprises the threaded section 109 and the contact section 117.

As shown in FIG. 5, a length $I_{184b}$ of the inner gap 184b measured essentially in parallel to the central axis C exceeds a length $I_{184a}$ of the outer gap 184a measured essentially in parallel to the central axis C. The lengths $I_{184b}$ and $I_{184a}$ equal a height of the third conical section 137. In the fully engaged state II and hence also later in the second breaking state V, the outer breaking point 136b is located below the inner breaking point 136a so that a top end 190a of the inner bolt 102a is arranged above a top end 190b of the outer bolt 102b whereby it may be prevented that any sharp edges of the outer bolt 190b protrude beyond the top end 190a of the inner bolt. A length $I_{182a}$ of the lower outer thread portion measured essentially in parallel to the central axis C may exceed a length $I_{182b}$ of the lower inner thread portion measured essentially in parallel to the central axis. The outer breaking point 136b comprises a number of shear zones 192 formed as material bridges with cutouts therebetween for connecting the upper part 176b of the outer bolt 102b to the lower part 178b of the outer bolt 102b. The shear zones 192, as shown in FIG. 5, are evenly distributed around the central axis C. In the shown embodiment, three shear zones are provided which each extending along an angle of between 50° and 70°, for example 60°, around the central axis C.

Figure 6:
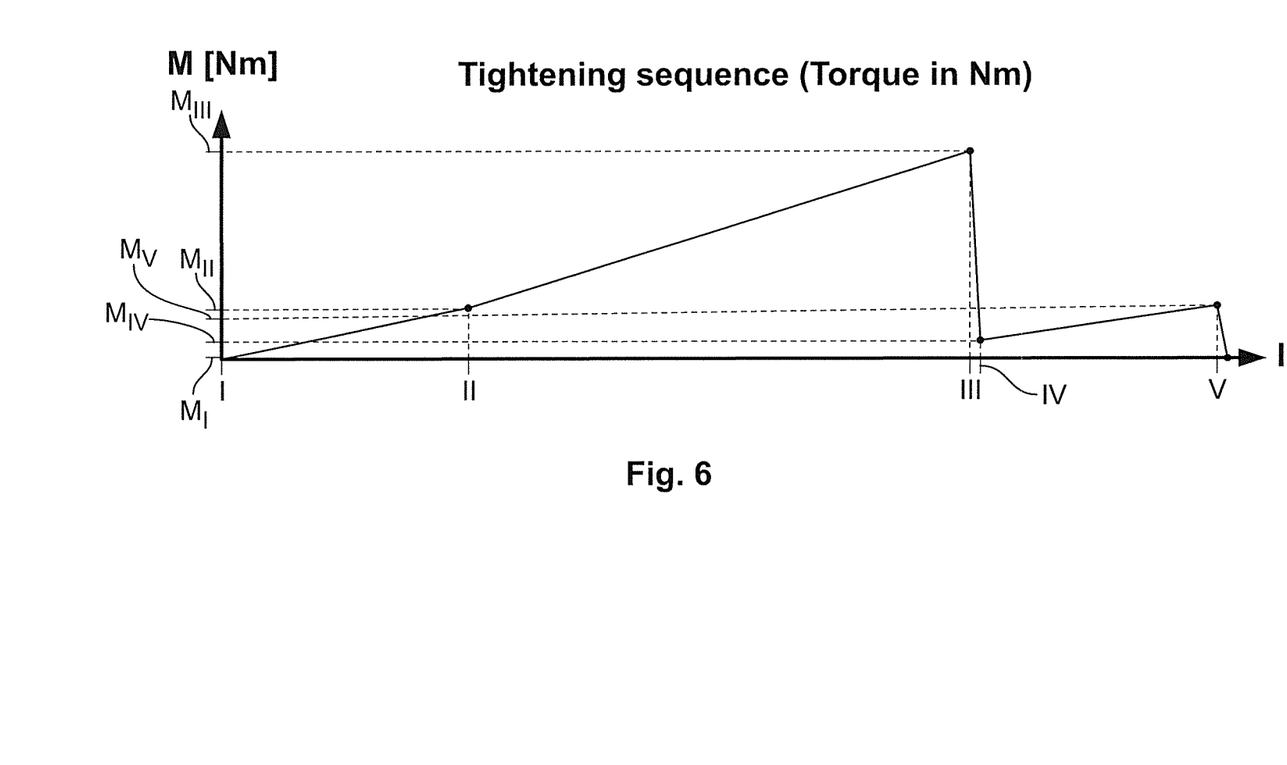
FIG. 6 is a graph of a tightening sequence of the wire connection assembly shown in FIGS. 1-5.

A tightening sequence for applying a torque M to the driving section 105 of the binding screw 101 as the binding screw 101 is transferred from the pre-assembled state I into the second breaking state V is shown in FIG. 6. In order to move the inner bolt 102a into the outer bolt 102b, separated into the pre-assembled state I, a pre-assembling torque $M_I$ is to be applied. For transferring the inner bolt 102a and the outer bolt 102b from the pre-assembled state I into the fully engaged state II by moving the outer thread 108a along the inner thread 108b, an engaging torque $M_{II}$ is applied which exceeds the pre-assembly torque $M_I$. For transferring the binding screw 101 from the fully engaged state into the fully inserted state III by moving the threaded section 109 along the threaded bore 155, an insertion torque $M_{III}$ is applied which is significantly higher than the engaging torque $M_{II}$. The insertion torque $M_{III}$ is applied until the first predefined breaking point 136a is sheared and thereby the binding screw 101 is transferred to the first breaking state IV, where a first broken torque $M_{IV}$ is significantly lower than the insertion torque $M_{III}$ and may be even lower than the engaging torque $M_{II}$. For then transferring the binding screw 101 from the first breaking state IV into the second breaking state V, a second breaking torque $M_V$ is applied which exceeds the first breaking torque $M_{IV}$ and may be lower than the engaging torque $M_{II}$.

Deviations from the above-described embodiment of the wire connection assembly 100 and binding screw 101 are possible within the scope of the present invention without departing from the inventive idea. The wire connection assembly 100 may comprise as many binding screws 101 as desired for a respective application. The wire connection assembly 100 and the binding screw 101 may be used for clamping and/or connecting any kind of wire, for example, copper wires, aluminum wires, wires made of any kind of metal or metal alloys, etc. All of the elements of the binding screw 101 can be provided in any number and form required for achieving a desired penetration depth 165 and torques $M_I$ to $M_V$ between states I to V. Accordingly, all of the elements of the connector body 149 can be provided in any number and form required for achieving the desired penetration depth 165 as well as clamping and/or contacting effect between the wire connection assembly 100 and a wire.

What is claimed is:

1. A wire connection assembly, comprising:
a connector body forming a wire receiving chamber and having a threaded bore extending perpendicular to the wire receiving chamber; and
a binding screw having:
an inner bolt including an outer thread and an inner breaking point, and
an outer bolt including an inner thread engaging the outer thread, a threaded section engaging the threaded bore, and an outer breaking point, the inner bolt extending fully though the outer bolt in a position in which the inner bolt is fully inserted into the outer bolt, a lower end of the binding screw is disposed outside the wire receiving chamber in a position in which a lower end of the threaded section engages the threaded bore.

2. The wire connection assembly of claim 1, wherein a central axis of the binding screw extends perpendicular to the wire receiving chamber.

3. The wire connection assembly of claim 2, wherein a distance between a lower end of the outer thread and a tip of the inner bolt is less than a distance between an upper end of the inner thread and a lower end of the outer bolt in a direction parallel to the central axis.

4. The wire connection assembly of claim 1, wherein the binding screw has a stop limiting movement of the inner bolt with respect to the outer bolt in an insertion direction.

5. The wire connection assembly of claim 4, wherein the stop includes an outer stop on the outer bolt.

6. The wire connection assembly of claim 5, wherein the stop includes an inner stop on the inner bolt.

7. The wire connection assembly of claim 2, wherein the inner thread and the outer thread have a same length in a direction parallel to the central axis.

8. The wire connection assembly of claim 2, wherein the outer breaking point is disposed in an inner gap dividing the inner thread into an upper inner thread portion and a lower inner thread portion.

9. The wire connection assembly of claim 8, wherein the outer breaking point is disposed at a lower end of the inner gap.

10. The wire connection assembly of claim 8, wherein the inner breaking point is disposed in an outer gap dividing the outer thread into an upper outer thread portion and a lower outer thread portion.

11. The wire connection assembly of claim 9, wherein a length of the inner gap is greater than a length of the outer gap in a direction parallel to the central axis.

12. The wire connection assembly of claim 1, wherein the inner bolt and the outer bolt form a contact section of the binding screw.

13. The wire connection assembly of claim 12, wherein the inner bolt and the outer bolt form a penetration portion at the contact section.

14. The wire connection assembly of claim 13, wherein the inner bolt forms a first conical section of the penetration portion and the outer bolt forms a second conical section of the penetration portion.

15. The wire connection assembly of claim 1, wherein a first torque required to move the outer thread along the inner thread is less than a second torque required to move the threaded section along the threaded bore.

16. The wire connection assembly of claim 15, wherein, when the second torque exceeds a shearing torque of the inner breaking point, the inner bolt is divided into an upper part and a lower part.

17. The wire connection assembly of claim 16, wherein a third torque less than the second torque is required to move the upper part of the inner bolt with respect to the lower part along the outer bolt.

18. The wire connection assembly of claim 17, wherein the third torque imparts a tensile stress between an upper part of the outer bolt and a lower part of the outer bolt, and when the tensile stress exceeds a tensile strength of the outer breaking point, the outer bolt is separated into the upper part of the outer bolt and the lower part of the outer bolt.

19. A binding screw for a wire connection assembly, comprising:
   an inner bolt including an outer thread and an inner breaking point; and
   an outer bolt including an inner thread engaging the outer thread, a threaded section engaging a threaded bore of a connector body, and an outer breaking point, the inner bolt extending fully though the outer bolt in a position in which the inner bolt is fully inserted into the outer bolt, the inner bolt and the outer bolt forming a contact section of the binding screw and a penetration portion at the contact section, the inner bolt forming a first conical section of the penetration portion and the outer bolt forming a second conical section of the penetration portion.

20. A wire connection assembly, comprising:
   a connector body forming a wire receiving chamber and having a threaded bore extending perpendicular to the wire receiving chamber; and
   a binding screw with a central axis extending perpendicular to the wire receiving chamber, the binding screw having:
      an inner bolt including an outer thread and an inner breaking point, and
      an outer bolt including an inner thread engaging the outer thread, a threaded section engaging the threaded bore, and an outer breaking point, the outer breaking point disposed in an inner gap dividing the inner thread into an upper inner thread portion and a lower inner thread portion.

21. The wire connection assembly of claim 20, wherein the outer breaking point is disposed at a lower end of the inner gap.

22. The wire connection assembly of claim 20, wherein the inner breaking point is disposed in an outer gap dividing the outer thread into an upper outer thread portion and a lower outer thread portion.

23. The wire connection assembly of claim 22, wherein a length of the inner gap is greater than a length of the outer gap in a direction parallel to the central axis.

24. A wire connection assembly, comprising:
   a connector body forming a wire receiving chamber and having a threaded bore extending perpendicular to the wire receiving chamber; and
   a binding screw having:
      an inner bolt including an outer thread and an inner breaking point, and
      an outer bolt including an inner thread engaging the outer thread, a threaded section engaging the threaded bore, and an outer breaking point, the inner bolt and the outer bolt forming a contact section of the binding screw and a penetration portion at the contact section, the inner bolt forming a first conical section of the penetration portion and the outer bolt forming a second conical section of the penetration portion.

* * * * *